Nov. 30, 1954
L. SAIVES
2,695,789
CHUCK
Filed June 14, 1952
2 Sheets-Sheet 1
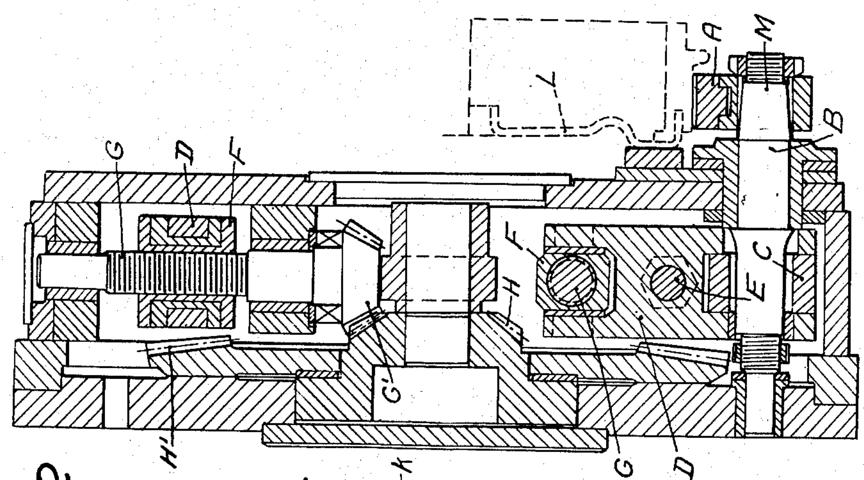
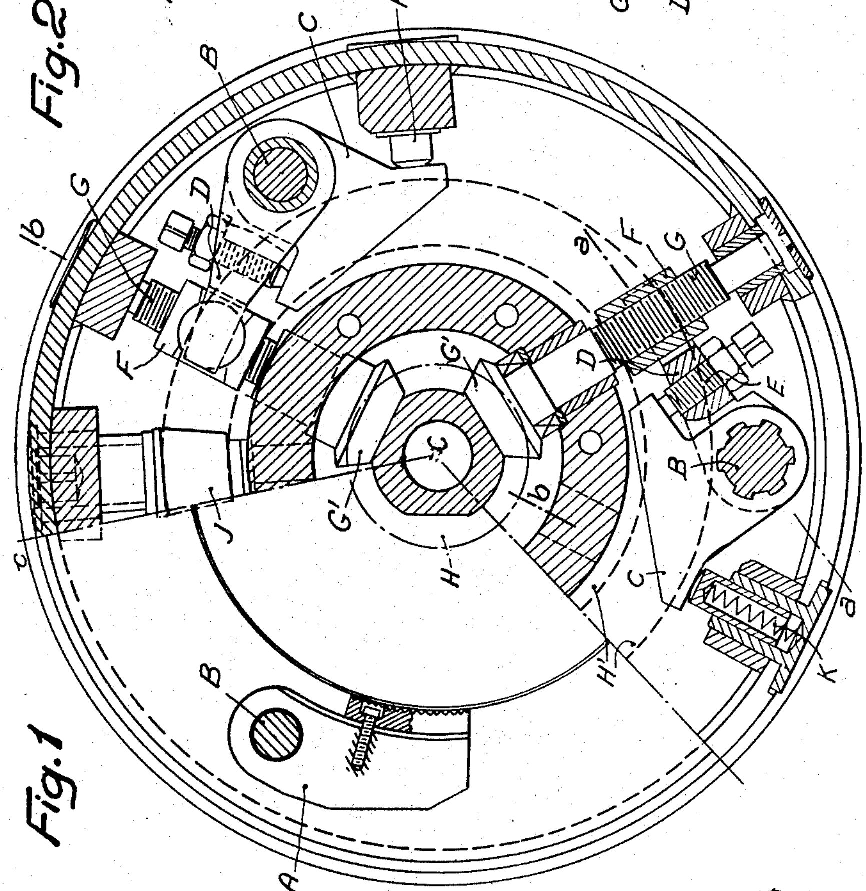
INVENTOR
LEON SAIVES
BY Robert E Burns
ATTORNEY Nov. 30, 1954 L. SAIVES 2,695,789
CHUCK
Filed June 14, 1952 2 Sheets-Sheet 2
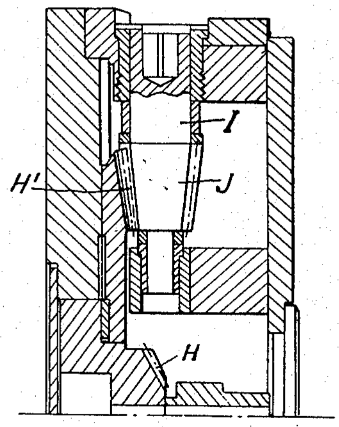
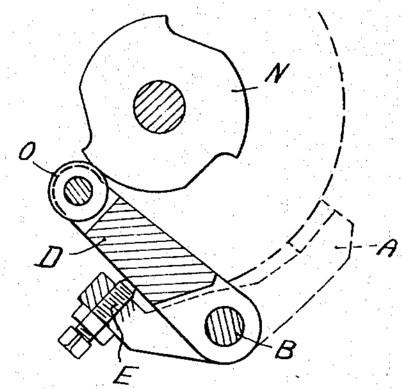
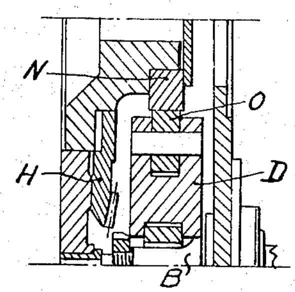
INVENTOR
LEON SAIVES
BY Robert E. Burns
ATTORNEY

United States Patent Office 2,695,789
Patented Nov. 30, 1954

2,695,789

CHUCK

Léon Saives, Billancourt, France, assignor to Regie Nationale des Usines Renault, Billancourt, France, a French corporation Application June 14, 1952, Serial No. 293,629

Claims priority, application France August 3, 1951

8 Claims. (Cl. 279—106)

This invention relates to chucks comprising gripping jaws and concerns improvements in such chucks, which permit correct operation without appreciable wear on the component parts of the chuck.

The chucks normally employed have certain disadvantages. Three-jaw chucks are generally controlled by a spiral cam cut in the rear face of a bevel wheel. The contact between the cam and the grooves in the jaws is therefore a linear contact, which results in wearing of the cam surfaces and stiffness in operation.

The jaws slide in T-shaped slots, the precise adjustment of which is a delicate operation and which rapidly become worn. An addition, this construction cannot be fluid-tight and the penetration of the spraying liquid and of chips into the interior of the chuck is unavoidable.

The improvements according to the invention consist in mounting the jaws on pivoting pins which support rocking levers adjustable in relation to arms connected to nuts in engagement with the screwthreaded stem of of rods on which there are mounted bevel pinions meshing with a bevel wheel. The said bevel wheel is double and the second wheel is engaged by a bevel pinion for operating the chuck.

The invention also includes certain constructional details which will hereinafter be more particularly described.

In the accompanying drawings:

Figure 1 shows a three-jaw chuck according to the invention, partly broken away to show the means for controlling the jaws on the right-hand side of the figure;

Figure 2 shows, in its lower part, a section on the line *a—a* of Figure 1, and in its upper part a section on the line *b—b* of the same figure;

Figure 3 is a section on the line *c—c* of Figure 1, and

Figures 4 and 5 show a modified form of the means controlling the jaws.

Referring to the drawings, it will be seen that the chuck comprises three jaws A mounted on pivoting pins B, which also support the rocking levers C. Arms D freely mounted on the pins B are adjustable in relation to the rocking levers C through screws E engaging with the said arms D and pressing against a tail piece of the rocking lever so as to cause the pin B and the jaw A to pivot for the adjustment.

The arms D are connected to nuts F, preferably having a trapezoidal thread, which are in engagement with screwthreaded rods G suitably guided and supporting bevel pinions $G^1$. The bevel pinions $G^1$ mesh with bevel wheel H of a double bevel wheel, the second wheel $H^1$ of which is engaged by a pinion J on a rod I, with which there engages a suitable tool or key for the operation of the chuck. The rocking levers C are returned by spring-loaded dogs K. The chucks A grip the work L, for example (Figure 2). The jaws A are mounted on conical pins M.

The operation of the mechanism will readily be understood. Rotation of the rod I produces, through the pinion J meshing with the wheel $H^1$ fast with the wheel H, which meshes with pinions $G^1$, the rotation of the rods G on which the nuts F move and drives the arms D. These arms turn, through rocking levers C, the arms B driving the jaws A. The adjustment is effected, as hereinbefore described, by means of the screws E.

When the chuck is adapted always to receive the same kind of work, it is provided with tempered jaws cut to the required form. When it is intended to receive work of various diameters, it is provided with jaws of spiral shape.

To sum up, this device has the following features:

1. The jaws are pivoted on a shaft instead of sliding in a T-shaped slot. Since the rotation is of small amplitude, suitable fluid-tightness of the pivot pin B can be ensured.

2. The transmission of the effort takes place through bevel pinions, the contact of which is accurate, and a screw-and-nut system which can be machined to provide a proper bearing surface between the nut and the screw, for instance by providing them with a trapezoidal thread.

3. The jaws being mounted on the conical ends of splined pins in the grooves of which are mounted the rocking levers which are adjustable relative to the driving arm, it is possible to adjust the concentricity of the jaws relative to the axis of the chuck without necessitating, for this purpose, any machine-finishing of the jaws when the chuck is positioned on the machine.

In a modification of this mecanism, as illustrated in Figures 4 and 5, the arms D may be controlled by a cam N having three projections, provided that their throw is small. The cam N is in turn controlled by the wheel H.

I claim:

1. A driving mechanism adapted for actuating the jaws of a chuck comprising, in combination, an oscillatable shaft adapted to carry a jaw, a rocking lever rigidly connected to said shaft, an arm freely rotatable on said shaft and engageable with said rocking lever to cause said lever to pivot and thereby to rotate said shaft in one direction of movement of said arm, a bevel wheel, a rotatable rod carrying a pinion in meshing engagement with the bevel wheel, said rod being adapted to be engaged by a tool for rotating it, and means for transmitting the movements of said bevel wheel to said arm.

2. A driving mechanism adapted for simultaneously actuating a plurality of jaws in a chuck comprising, in combination, a plurality of oscillatable shafts, each adapted to carry one of said jaws, a rocking lever rigidly connected to each of said shafts, an arm freely rotatable on each shaft and engageable with each rocking lever to cause said lever to pivot and thereby to rotate said shaft in one direction of movement of said arm, a bevel wheel, a rotatable rod carrying a pinion in meshing engagement with bevel wheel, said rod being adapted to be engaged by a tool for rotating it, and means for simultaneously transmitting the movements of said level to each of said levers.

3. A driving mechanism adapted for actuating the jaws of a chuck comprising, in combination, an oscillatable shaft adapted to carry a jaw, a rocking lever rigidly connected to said shaft, an arm freely rotatable on said shaft and engageable with said rocking lever to cause said lever to pivot and thereby to rotate said shaft in one direction of movement of said arm, a bevel wheel, a rotatable rod carrying a pinion in meshing engagement with the bevel wheel, said rod being adapted to be engaged by a tool for rotating it, and means for transmitting the movements of said bevel wheel to said arm, said means comprising a nut carried by the arm, a threaded shaft engageable in said nut, said shaft having at its inner end a pinion in meshing engagement with a second pinion rotatable by said bevel pinion, whereby rotation of said bevel pinion causes rotation of said shaft and translational movement of said nut.

4. A driving mechanism adapted for simultaneously actuating a plurality of jaws in a chuck comprising, in combination, a plurality of oscillatable shafts, each adapted to carry one of said jaws, a rocking lever rigidly connected to each of said shafts, an arm freely rotatable on each shaft and engageable with each rocking lever to cause said lever to pivot and thereby to rotate said shaft in one direction of movement of said arm, a bevel wheel, a rotatable rod carrying a pinion in meshing engagement with the bevel wheel, said rod being adapted to be engaged by a tool for rotating it, and means for simultaneously transmitting the movements of said bevel to each of said levers, said means comprising a nut carried by each arm, a threaded shaft engageable in each nut, each shaft having at its inner end a pinion in meshing engagement with a second pinion rotatable by said bevel pinion, whereby rotation of said bevel pinion causes rotation of each shaft and translational movement of each nut.

5. A driving mechanism adapted for actuating the jaws of a chuck comprising, in combination, an oscillatable shaft adapted to carry a jaw, a rocking lever rigidly connected to said shaft, an arm freely rotatable on said shaft and engageable with said rocking lever to cause said lever to pivot and thereby to rotate said shaft in one direction of movement of said arm, a bevel wheel, a rotatable rod carrying a pinion in meshing engagement with the bevel wheel, said rod being adapted to be engaged by a tool for rotating it, and means for transmitting the movements of said bevel wheel to said arm, said means comprising a cam rotatable by said bevel pinion and cam followers provided at the end of said arm for engagement with the surface of said cam.

6. A driving mechanism adapted for simultaneously actuating a plurality of jaws in a chuck comprising, in combination, a plurality of oscillatable shafts, each adapted to carry one of said jaws, a rocking lever rigidly connected to each of said shafts, an arm freely rotatable on each shaft and engageable with each rocking lever to cause said lever to pivot and thereby to rotate said shaft in one direction of movement of said arm, a bevel wheel, a rotatable rod carrying a pinion in meshing engagement with the bevel wheel, said rod being adapted to be engaged by a tool for rotating it, and means for simultaneously transmitting the movements of said bevel to each of said levers, said means comprising a cam rotatable by said bevel pinion and a cam follower provided at the end of each arm for engagement with the surface of said cam.

7. A mechanism as defined in claim 1, wherein spring-loaded dogs are provided for returning the rocking lever.

8. A mechanism as defined in claim 1, wherein said arm and said rocking lever are adjustably connected by means of screws engaging said arm.

References Cited in the file of this patent

FOREIGN PATENTS

| Number | Country | Date |
| --- | --- | --- |
| 254,748 | Switzerland | 1948 |